United States Patent Office.

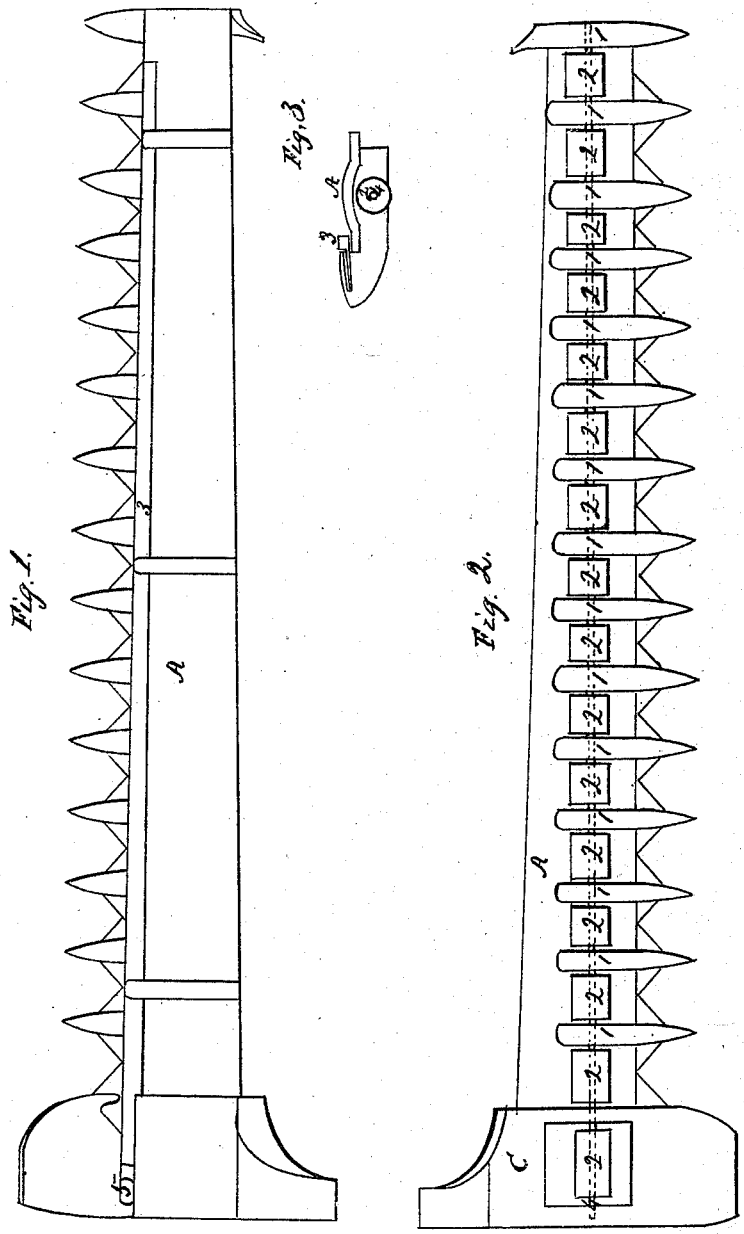

J. J. BARNES, OF MONTICELLO, INDIANA.

Letters Patent No. 74,191, dated February 11, 1868.

IMPROVEMENT IN FINGER-BARS FOR HARVESTERS.

*The Schedule referred to in these Letters Patent and making part of the same.*

TO ALL WHOM IT MAY CONCERN:

Be it known that I, J. J. BARNES, of Monticello, in the county of White, and State of Indiana, have invented a new and useful Improvement in the Finger-Bar of Mowers and Reapers; and I do hereby declare that the following is a full, clear, and exact description of the construction and operation of the same, reference being had to the annexed drawings, and letters of reference marked thereon, making a part of this specification, in which—

Figure 1 is a top or plan view of my cutter-bar.

Figure 2 is a view of the under side of the cutter-bar, showing the friction-rollers.

My improvement consists in the employment of a series of loose friction-rollers upon the under side of the finger-bar, having for their axis a rod longitudinal therewith, and so arranged as to alternate with the cutter-guards, which serve as bearings for the rod.

As represented in the drawings, A is the finger-bar, (shown inverted in fig. 2,) the numeral 1 indicating the fingers or guards, and 2 the rollers, each occupying one of the spaces between the guards; 3, the sickle, and 4 the axial rod upon which the rollers are hung. This rod extends from end to end of the finger-bar, and, to insure a firm support for the rollers, holes are provided in the guards through which the rod passes, thus giving it a bearing between each roller.

The object of this invention is to enable the common caster-wheels or rollers for supporting the finger-bar at each end, to be dispensed with on mowers, when cutting close to the ground, and also to reduce the side-draught, by lessening the resistance on the finger-bar, when any part thereof comes in contact with the ground, which often occurs where the surface is uneven. And when caster-wheels are used, as in cutting high, my series of rollers is often of much importance, in preventing the finger-bar from riding or tearing up the surface of the ground, when the wheels run in a dead furrow or other depression of the ground.

My improvement is especially useful when applied to the single drive-wheel machine, in obviating the side-draught consequent on the finger-bar having to sustain its own weight, and frequently a portion of that of the machine.

The rollers are preferably made of suitably hard wood, and of a diameter that will not elevate the finger-bar too high for cutting. The bar is made concave to the rollers in cross-section, which shape adapts it to receive them without elevating the sickle too much, and also adds to its stiffness. The fingers are made to project below the bar sufficiently to receive the rod through them, and also to separate the rollers, which, from being loose on their axes, act independent of one another, and with the least friction, giving efficient support to the bar at any portion of it which may chance to come in contact with the ground.

This method of constructing the cutter-bar secures greater strength with less material, adding the advantage of lightness to that of reduced friction. The bar being concave in cross-section, and the rod 4 extending from end to end, and secured in each guard 1, the effect is similar to that of the chord-timber and braces of an arch.

I am aware that wheels have been used on one or both ends of the finger-bar, and that one continuous roller, having journals at each end of the bar, has been employed, and these I do not claim; but

What I claim as my invention, and desire to secure by Letters Patent, is—

The series of loose friction-rollers, 2, in combination with the guards 1, rod 4, and finger-bar A, arranged and operating substantially as and for the purposes set forth.

J. J. BARNES.

Witnesses:
GEO. L. CHAPIN,
A. HAYWARD.